US009524508B2

(12) United States Patent
McIntyre et al.

(10) Patent No.: US 9,524,508 B2
(45) Date of Patent: *Dec. 20, 2016

(54) METHOD AND PROCESSES FOR SECURE REAL TIME PURCHASE VALIDATION AWARD SYSTEM

(71) Applicant: Young America, LLC, Minneapolis, MN (US)

(72) Inventors: David Andrew McIntyre, Scottsdale, AZ (US); Grant Lee Stewart, Minnetonka, MN (US); Donovan Keith Loucks, Providence, RI (US)

(73) Assignee: Young America, LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,082

(22) Filed: Jun. 29, 2015

(65) Prior Publication Data
US 2015/0302455 A1 Oct. 22, 2015

Related U.S. Application Data

(63) Continuation of application No. 13/958,960, filed on Aug. 5, 2013, now Pat. No. 9,087,342, which is a continuation of application No. 10/772,717, filed on Feb. 5, 2004, now Pat. No. 8,511,553.

(60) Provisional application No. 60/447,052, filed on Feb. 13, 2003.

(51) Int. Cl.
G06K 15/00 (2006.01)
G06Q 30/02 (2012.01)
G06Q 20/20 (2012.01)

(52) U.S. Cl.
CPC .......... *G06Q 30/0234* (2013.01); *G06K 15/00* (2013.01); *G06Q 20/209* (2013.01); *G06Q 30/02* (2013.01); *G06Q 30/0225* (2013.01); *G06Q 30/0238* (2013.01)

(58) Field of Classification Search
USPC .................... 235/383, 381; 705/14.31–14.34
See application file for complete search history.

(56) References Cited

U.S. PATENT DOCUMENTS

| 4,723,212 A | 2/1988 | Mindrum et al. |
| 4,882,675 A | 11/1989 | Nichtberger et al. |
| 4,896,791 A | 1/1990 | Smith |
| 4,949,256 A | 8/1990 | Humble |

(Continued)

FOREIGN PATENT DOCUMENTS

WO 9404979 3/1994

OTHER PUBLICATIONS

"Catalina Marketing's Checkout Rebate Offers Simple Solutions to Traditional Rebate Programs" PR Newswire, Feb. 24, 1998 (2 pp.).

(Continued)

Primary Examiner — Ahshik Kim
(74) Attorney, Agent, or Firm — Winthrop & Weinstine, P.A.

(57) ABSTRACT

A method and processes for a secure real-time processing of purchase validation award requests is described. The method includes processes to submit purchase information on a real-time basis and to check on the status of the processing of the submitted purchase validation award system request also on a real-time basis. The method uses a computer information network to perform the required processes.

18 Claims, 2 Drawing Sheets

(56) References Cited

U.S. PATENT DOCUMENTS

| | | |
|---|---|---|
| 5,056,019 A | 10/1991 | Schultz et al. |
| 5,173,851 A | 12/1992 | Off et al. |
| 5,176,224 A | 1/1993 | Spector |
| 5,200,889 A | 4/1993 | Mori |
| 5,202,826 A | 4/1993 | McCarthy |
| 5,256,863 A | 10/1993 | Ferguson et al. |
| 5,287,268 A | 2/1994 | McCarthy |
| 5,305,197 A | 4/1994 | Axler et al. |
| RE34,915 E | 4/1995 | Nichtberger et al. |
| 5,467,269 A | 11/1995 | Flaten |
| 5,483,049 A | 1/1996 | Schulze, Jr. |
| 5,502,636 A | 3/1996 | Clarke |
| 5,581,064 A | 12/1996 | Riley et al. |
| 5,665,953 A | 9/1997 | Mazzamuto et al. |
| 5,710,886 A | 1/1998 | Christensen et al. |
| 5,729,693 A | 3/1998 | Holda-Fleck |
| 5,761,648 A | 6/1998 | Golden et al. |
| 5,774,870 A | 6/1998 | Storey |
| 5,791,991 A | 8/1998 | Small |
| 5,806,043 A | 9/1998 | Toader |
| 5,822,735 A | 10/1998 | De Lapa et al. |
| 5,855,007 A | 12/1998 | Jovicic et al. |
| 5,892,827 A | 4/1999 | Beach et al. |
| 5,905,246 A | 5/1999 | Fajkowski |
| 5,907,830 A | 5/1999 | Engel et al. |
| 5,923,016 A | 7/1999 | Fredregill et al. |
| 5,924,078 A | 7/1999 | Naftzger |
| 5,924,080 A | 7/1999 | Johnson |
| 5,945,653 A | 8/1999 | Walker et al. |
| 5,983,196 A | 11/1999 | Wendkos |
| 6,035,280 A | 3/2000 | Christensen |
| 6,039,244 A | 3/2000 | Finsterwald |
| 6,061,660 A | 5/2000 | Eggleston et al. |
| 6,068,183 A | 5/2000 | Freeman et al. |
| 6,138,911 A | 10/2000 | Fredregill et al. |
| 6,173,267 B1 | 1/2001 | Cairns |
| 6,278,980 B1 | 8/2001 | Wendkos |
| 6,328,339 B2 | 12/2001 | Dixon, III et al. |
| 6,336,098 B1 | 1/2002 | Fortenberry et al. |
| 6,450,407 B1 | 9/2002 | Freeman et al. |
| 6,609,113 B1 | 8/2003 | O'Leary et al. |
| 6,697,785 B2 | 2/2004 | Dixon, III et al. |
| 6,741,968 B2 | 5/2004 | Jacoves et al. |
| 6,745,936 B1 | 6/2004 | Movalli et al. |
| 6,748,365 B1 | 6/2004 | Quinlan et al. |
| 6,847,935 B1 | 1/2005 | Solomon et al. |
| 6,865,544 B1 | 3/2005 | Austin |
| 6,874,935 B2 | 4/2005 | Edelman et al. |
| 6,915,271 B1 | 7/2005 | Meyer et al. |
| 6,925,441 B1 | 8/2005 | Jones et al. |
| 6,928,411 B1 | 8/2005 | Fox et al. |
| 6,932,270 B1 | 8/2005 | Fajkowski |
| 7,120,591 B1 | 10/2006 | Solomon et al. |
| 7,146,328 B1 | 12/2006 | Solomon et al. |
| 7,630,935 B2 | 12/2009 | Loeger et al. |
| 8,010,405 B1 | 8/2011 | Bortolin et al. |
| 8,108,304 B2 | 1/2012 | Loeger et al. |
| 8,126,772 B1 | 2/2012 | LeFebvre |
| 8,204,781 B2 | 6/2012 | Solomon et al. |
| 8,321,271 B2 | 11/2012 | LeFebvre |
| 8,444,469 B2 | 5/2013 | Stanek et al. |
| 8,511,553 B1 | 8/2013 | McIntyre et al. |
| 8,515,808 B2 | 8/2013 | Postrel |
| 8,589,221 B2 | 11/2013 | Quinlan et al. |
| 8,676,642 B1 | 3/2014 | Sheley |
| 8,775,241 B2 | 7/2014 | Bortolin et al. |
| 8,833,645 B2 | 9/2014 | Stretch et al. |
| 8,856,026 B2 | 10/2014 | Foodman et al. |
| 9,064,268 B2 | 6/2015 | Larrick et al. |
| 9,087,342 B2 * | 7/2015 | McIntyre ............... G06K 15/00 |
| 2004/0210481 A1 | 10/2004 | Quinlan et al. |
| 2005/0021402 A1 | 1/2005 | Strasser |
| 2005/0023346 A1 | 2/2005 | Bakker et al. |
| 2007/0061206 A1 | 3/2007 | LeFebvre |
| 2007/0088610 A1 | 4/2007 | Chen |
| 2008/0015935 A1 | 1/2008 | Ford |
| 2008/0082407 A1 | 4/2008 | Georgiadis et al. |
| 2008/0162299 A1 | 7/2008 | Gusler et al. |
| 2009/0012870 A1 | 1/2009 | Habeishi |
| 2009/0157475 A1 | 6/2009 | Crafton et al. |
| 2009/0313110 A1 | 12/2009 | Asai et al. |
| 2010/0174596 A1 | 7/2010 | Gilman et al. |
| 2011/0022448 A1 | 1/2011 | Strock et al. |
| 2011/0295675 A1 | 12/2011 | Reodica |
| 2011/0320251 A1 | 12/2011 | Ates et al. |
| 2013/0275201 A1 | 10/2013 | Goff et al. |
| 2013/0317900 A1 | 11/2013 | Fennel et al. |
| 2014/0006133 A1 | 1/2014 | Peterson |
| 2014/0012649 A1 | 1/2014 | Donlan |
| 2014/0108236 A1 | 4/2014 | Purves |
| 2014/0278596 A1 | 9/2014 | Cordero et al. |
| 2014/0337191 A1 | 11/2014 | Senser |
| 2015/0120421 A1 | 4/2015 | Deshpande et al. |

OTHER PUBLICATIONS

Margulies, ED. "236 Killer Voice Processing Applications" Flatiron Publishing, Inc., Jul. 1995 (pp. 7-50-7-53).

Miscellaneous rebate forms, with the most recent dated Feb. 1, 2000 (30 pp.).

Peppers, Don et al. "The One to One Future" Currency Doubleday, 1993 (pp. 95-123, 152-153).

* cited by examiner

METHOD AND PROCESSES FOR SECURE REAL TIME PURCHASE VALIDATION AWARD SYSTEM

CROSS REFERENCE TO RELATED APPLICATIONS

This application is a continuation of U.S. application Ser. No. 13/958,960, titled "A Method and Processes for Secure Real Time Purchase Validation Award System" filed Aug. 5, 2013 which is a continuation of U.S. application Ser. No. 10/772,717, titled "A Method and Processes for Secure Real Time Purchase Validation Award System," filed Feb. 5, 2004, now issued U.S. Pat. No. 8,511,553, which claims priority to U.S. Prov. Appl. No. 60/447,052, filed on Feb. 13, 2003, each of which is hereby incorporated herein by reference in its entirety.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of product marketing purchase award systems and more specifically to a method and processes for a secure real time purchase validation award system.

Awards based on purchases of products and services have long been used as a key marketing tool. There were only two major types of rewards, coupons which are available to the purchaser prior to the purchase of the item designated by that coupon and rebates which are awarded some time after the purchase of an item that is qualified to receive some type of that rebate. Items can be either products or services or any combination of products and services. Coupons are used at the time of the purchase and were supplied to the purchaser prior to the purchase of the item designated by that coupon and only require that the purchaser submit the coupon at the time of purchase. Premiums and sweepstakes are also award systems that are sometimes utilized as marketing tools.

Rebates on the other hand require that the purchaser request the rebate after the purchase of the item qualified to receive such a rebate. Rebates can be either a predetermined cash value to the purchaser or a variable based on the purchase price and are satisfied by a payment or credit issued to the purchaser.

As such rebate-style systems have evolved, they have changed into a multifaceted award system, which includes cash based rebates, rewards, refunds, premiums, entry into sweepstakes, gift cards, debit cards, credit cards, gift certificates, electronic gift certificates and credits to various accounts.

As this award based marketing has grown in size and scope with many more products and services covered by some type of award, there has developed a need for operations that can process the many award requests. Such operation are called fulfillment operations or fulfillment service providers (FSP). These FSP operations can be, but are not limited to the following: companies that provide such fulfillment services as their sole business, part of marketing promotion companies, Web hosting service companies, a software based operation that outsources the fulfillment activities, a part of a retailers operation, a part of a manufacturers op ration or a part of catalog sales operations.

Selling operations can be operations with physical stores, service providers and those that only use the Internet for their selling or any combination of sales channels. Selling operations can include, but are not limited to: retailers, distributors, manufacturers, marketing promotion companies, auctions and service providers.

In the prior art which is illustrated in the flow chart of FIG. 1, in step 10 the purchaser buys a qualified item from a selling operation where such qualified item provides for some type of award based on that purchase. At the time of purchase and/or delivery of the item, in the next step 20, the purchaser receives the award request form along with a receipt. The purchaser as part of step 20 fills out the information requested on the award request form along with other required information which may include such things as: the product UPC (Universal Product Code), the SKU (Stock Keeping Unit) identification, serial number or service identification number. This information is required as part of the verification process to allow the FSP to confirm the purchase of the qualified item. The required information can also include the receipt, either an original or copy depending on the terms of the specific award program. In some cases, the purchaser will be provided with special receipts that show only the qualified item and can be used solely for the purpose of requesting the award. Finally after filling out the award request form and supplying all of the required information, the purchaser mails the award request to the FPS using the address provided as part of the award request form.

Then is step 30 the FSP worker opens the mail with the award request form and other required information. In step 40, this worker or another FSP worker then reviews all of the information in the award request and matches it to the award offer. This step 40 is the most critical function performed by the FSP and is called purchase validation.

In step 50, a FSP worker enters data into a computer database.

In step 60 a FSP worker processes and mails out the award to the purchaser who submitted that award request form.

In step 70 the purchaser receives the award via the mail and the process is completed.

In some cases, this process is modified so that the purchaser can combine several award requests into one form which is then mailed to the FSP and processed using the same flow as shown in FIG. 1. All of the required information and the receipts are needed as a part of this combined award request.

In other cases, following the submittal of information in step 20, the purchaser may have the option of checking the status of the rebate request using the Internet.

Some methods have been developed to try to improve on the process of handling such award requests. The major development has been the use of Web sites to allow the purchaser to request a product marketing rebate where that Web site is also accessible to the selling operation. In this method the purchaser uses a computer to access the Web site where that purchaser provides the necessary information for a rebate including some type of transaction code provided at the time of purchase and/or delivery. This information is stored by the FSP in some type of database. The FSP then receives a large file from the selling operation containing as a minimum all of the transactions that would qualify for a rebate for a given period of time. The file may even contain all sales from that selling operation for that given period of time. The FSP must then store all of that large file on in a database and then associate the data received from the purchaser with the data received from the selling operation to complete the purchase validation operation and to then finish processing that rebate request into a cash value for the purchaser.

One of the problems with the prior art as shown in FIG. 1 is that the process takes anywhere from 6 to 12 weeks to complete and requires significant effort by the purchaser to collect all of the information, fill out the form and mail out the award request. Many potential purchasers avoid purchasing item with rewards associated with them because of the time-consuming and extensive effort required.

Still another problem with the present Web site based system is that it is limited to rebate offers. This creates problems for the selling operations since they can not use the full range of possible awards such as: premiums, rewards, sweepstakes entries, gift certificates, electronic gift certificates and credits to various accounts.

The other problem associated with the Web site rebate method is the large data files that must be transmitted from the selling operation to the FSP and then stored by the FSP. This is costly and time-consuming for both the FSP and the selling operation. Another concern with sending such data are potential issues with privacy violation, confidentiality, and security concerns.

BRIEF SUMMARY OF THE INVENTION

The primary object of the invention is to provide a real-time, secure Internet-based method and process for purchase validation award processing and make real-time status information available at all times to the purchaser, seller and manufacturer using unique transaction data that is supplied to the purchaser by the selling operation at the time of purchase and/or delivery.

Another object of the invention is to automatically handle secure data from the selling operation where such data is requested using encrypted data by the fulfillment system of this invention and is limited to only the selling transactions that are a part of that specific award being processed on record-by-record basis or as a batch file.

Another object of the invention is to allow entry of the unique transaction data by the purchaser, the selling operation or the FSP.

Yet another object of the invention is that the purchase validation and award calculation process is automated using a rules-based process.

Still yet another object of the invention is all processing is done on secure sites with encrypted data and on a real-time basis.

Another object of this invention is that it can accommodate all types of awards and can present award options to the purchaser.

Another object of the invention is that the purchaser can access the system using a secure Web site at any time during the award request processing and select the award or award option while also providing information about how the award is to be sent.

Another object of this invention is that the purchaser can access the system using a secure Web site at any time to team the status of the award process. As a part of this access, the purchaser is given a unique identity to simplify the access procedure. This unique identity can also be used by that purchaser for any subsequent award request from the same system.

Another object of this invention is that the FSP can check for product returns or service modifications or cancelations and cancel or adjust the award(s) accordingly.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a method and processes for a purchase validation award system comprising the steps of: a unique transaction code is assigned as part of a sales document supplied during purchase and/or delivery of said qualified item, said unique transaction code is entered into the fulfillment system on a secure computer information network site using an electronic system compatible with said computer information network site, then there is an automatic transmission of encrypted data from said fulfillment system to the purchase site on a real-time-basis utilizing said secure computer information network or the fulfillment system maintains a data warehouse, included in said automatic transmission is a request for only the purchase files associated with said unique transaction code or a yes/no approval based on the transaction codes, batch files combining several of said purchase files or individual records of said purchase files are transmitted automatically from said purchase site to said fulfillment system confirming said qualified item information, rules based control validation process is applied at said fulfillment system to establish and display award and award options to purchaser using said secure computer information network site, said purchaser selects said award or the award is automatically selected and the purchaser provides additional data on said secure computer information network site, using said additional data, said fulfillment system sends out award or data needed to complete award processing using said secure computer information network site, and said fulfillment system provides real time status information to said purchaser at all times on said secure computer information network site.

In accordance with another embodiment of the invention, there is disclosed a method and processes for secure real time purchase validation award system comprising the steps of: a unique transaction code is assigned for each qualified sales transaction or service as part of a document or documents supplied during purchase and/or delivery of a plurality of said qualified items or services, said unique transaction codes are entered into the fulfillment system on a secure computer information network site using an electronic system compatible with said computer information network site, then there is an automatic transmission of encrypted data from said fulfillment system to the purchase site on real-time basis utilizing said secure computer information network, or the fulfillment system maintains a data warehouse, included in said automatic transmission is a request for only the purchase files associated with said unique transaction codes or a yes/no approval based on the transaction codes, batch files combining several of said purchase files or individual records of said purchase files are transmitted automatically from said purchase site to said fulfillment system confirming said qualified items information, rules based control validation process is applied at said fulfillment system to establish and display award and award options to purchaser using said secure computer information network site, said purchaser may select said award or award is automatically selected and the purchaser provides additional data on said secure computer information network site, using said additional data, said fulfillment system sends out award or data needed to complete award processing using said secure computer information network site, and said fulfillment system provides real time status information to said purchaser at all times on said secure computer information network site.

DETAILED DESCRIPTION

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF TH PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

This invention improves and automates the processing of purchase award requests from the purchaser of a qualified item. A qualified item is a product or service or any combination of products and services purchased during a time period when some type of award is associated with the product(s) or service(s). Such awards usually are in force for only a limited time so the qualified item purchase and subsequent award request must occur during that time.

The type of awards covered by this invention are those that are granted after the purchase of the qualified item and require some action by the purchaser to request the award. In addition, there may be a variety of award options available to the purchaser that the purchaser can choose from during the award request processing.

Figure 1:
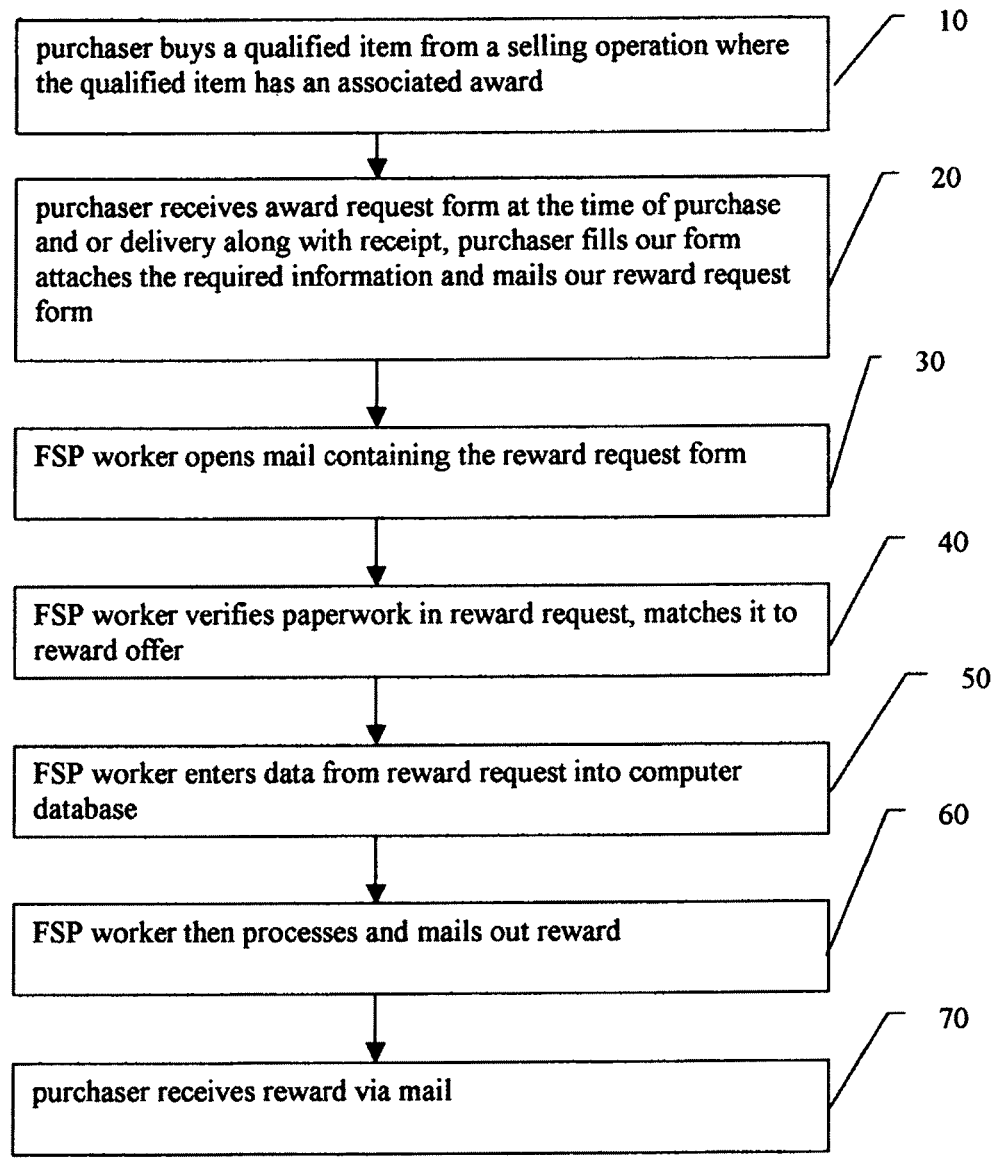
FIG. 1 is a flow chart of the prior art of processing award request forms.
Figure 2:
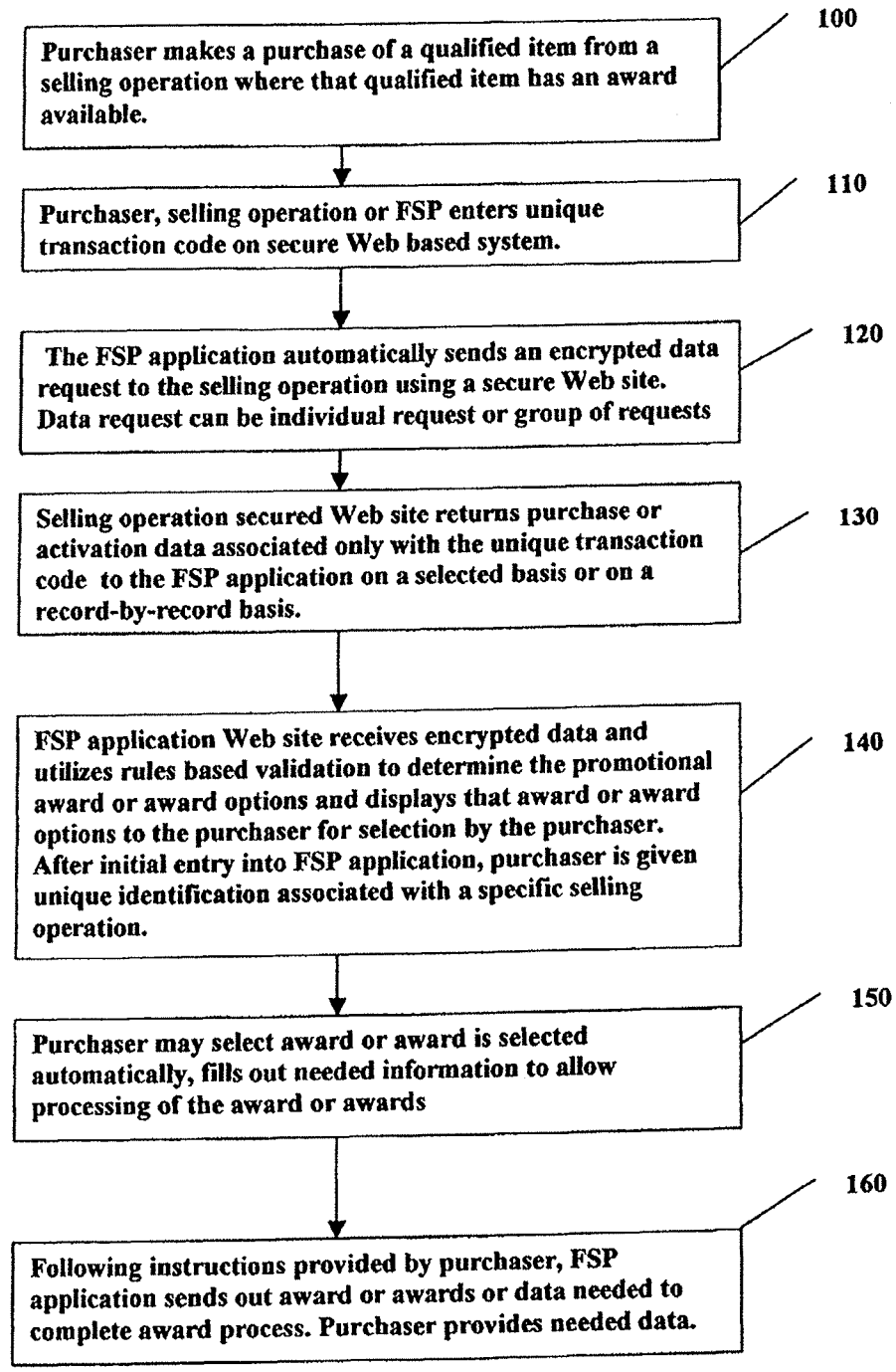
FIG. 2 is a flow chart illustrating the method of this invention.

The preferred embodiment of the invention is illustrated in the flowchart of FIG. 2. In step 100 a purchaser purchases a qualified item from a selling organization during a time period when the award coupled to the qualified item(s) is in effect. The purchase and delivery of the qualified item can occur at the same time or the purchase can be made with a subsequent delivery to the purchaser of that qualified item (s). At the time of purchase or delivery, the purchaser receives a receipt, packing slip or invoice either as a printed document or via the Internet electronically. These documents will contain all of the data necessary for the purchaser to request the award coupled to that qualified item. The data includes unique transaction data generated at the time of purchase and/or delivery.

In step 110, which may occur some time after the purchase and delivery of the qualified item or it may occur at the time of purchase and/or delivery, the purchaser, the selling organization or a FSP enters the unique transaction data that was generated at the time of purchase and/or at the time of delivery of the qualified item. This unique transaction data is entered using a secure Web based system to assure privacy and control of this unique transaction data.

In step 120, the secure Web site operating in real time automatically transmits an encrypted data request to the selling operation wherein this encrypted data request seeks only the data associated with the unique transaction data previously entered into the secure Web site in step 110. The data request can be either on a record-by-record basis for each set of transaction data or on a batch basis where several sets of transaction data are combined into one group for transmission.

In step 130, in real time, the selling operation that received the encrypt d data request automatically transmits back to the secure Web site purchase or activation data or confirmation data or a combination of all three types of data also utilizing either a record-by-record mode or in a batch mode where several sets of the transaction data are combined into one group for this transmission. Only the selling operation data that is associated with the purchase transaction that generated the unique transaction data as part of step 100 and the encrypted data request generated during step 120 is transmitted back to the secure Web site as part of this step.

In step 140, the secure Web site receives the purchase or activation or confirmation data or a combination of all three types of data and uses completely automated rules based validation to determine the appropriate award or set of award options which can then be displayed to the purchaser for selection by the purchaser utilizing the secure Web site. This completely automated rules based processing includes fraud analysis to minimize any abuses in the award request. The purchaser may be on the secure Web site as a result of step 110 where the purchaser was the party entering the unique transaction data into the secure Web site as part of an award request.

In step 150, while connected to the secure Web site, the purchaser selects the award or set of award options and provides to the secure Web site the necessary information needed to allow for further processing of the award request. At this time the invention may assign a unique identifier to that purchaser relating to the specific selling operation so that the process of the purchaser connecting in the future to the secure Web site for additional award requests for purchase of qualified items from that same selling operation can be simplified. Another fraud analysis using completely automated rules based processing is performed at this time.

In step 160, this invention uses the information provided by the purchaser in step 150 to send out the award or set of awards or data needed to complete the award process. As part of step 160, the system of the invention can automatically check for product returns, changes to quantities or changes to services or cancellations of services. If such changes have occurred, no award or a suitably modified award is sent. The award or set of awards or needed data from the purchaser is based on the details of the specific award program established by the selling operation, product manufacturer or service provider and the information provided y the purchaser in step 150.

This invention provides access to the purchaser, using the same secure Web site, to the status of the award request processing from step 110 up the completion of step 160 of the flowchart in FIG. 2 up to and even beyond the delivery of the award to the purchaser. The purchaser has the option to check real-time status of one or more of the award options which may not be complete with the delivery of an award to that purchaser.

In another embodiment of this invention, there can be a plurality of award requests based on either a plurality of qualified items or services purchased as part of one transaction or a plurality of qualified items or services purchased over a time period in differing transactions. In either such case the processing shown in FIG. 2 is followed as a part of this invention.

This invention is designed to be flexible and to accommodate a large variety of award programs and types of awards. The real time processes and the secure Web site allow for rapid and efficient processing since the only data transmitted during the use of this invention is limited to that directly needed to complete the award request process.

The invention is further designed to work with a variety of electronic systems. While the preferred embodiment uses a computer or terminal to communicate with the system of the method of the invention, it is possible to use other means such as facsimile machines or telephone-based systems to achieve the same results. A telephone-based system could use a call center manned by human customer service representatives or an automated system. The automated system could use an interactive voice response method or could use a touch tone based system.

Various wireless systems capable of communicating with the method of this invention could also be used as an alternative to the computer information system. While the preferred embodiment calls for a secure electronic system, clearly a non-secure system could also be used as a part of this invention.

The method and processes of the invention are still compatible with use of the mail to request the award as well as the use of the mail system to provide the award to the purchaser.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method for a processing an award claim subsequent to a point of sale transaction involving the purchase of an award qualifying product or service, the method comprising:
   receiving information from a purchaser during a network-connected session with a computer information network using an electronic system compatible with the computer information network, the information from the purchaser comprising unique transaction data associated with a point of sale transaction comprising at least one of a purchase or delivery of a qualified item;
   upon receipt of the unique transaction data, transmitting a data request for purchase data associated with the point of sale transaction;
   upon receipt of the purchase data, applying automated, rules based control validation to automatically validate the award;
   presenting a plurality of award options available to the purchaser from which the purchaser can choose, and receiving a selection of an award from the plurality of award options; and
   while the purchaser remains in the network-connected session with the computer information network, transmitting the results of the automated rules based validation to the purchaser via the computer information network.

2. The method of claim 1, wherein applying automated, rules based control validation to automatically validate the award comprises determining the plurality of award options available to the purchaser.

3. The method of claim 1, wherein the plurality of award options comprise two or more of a cash-based rebate or refund, an entry into a sweepstakes, a gift card, a debit card, a credit card, a gift certificate, and a credit to an account.

4. The method of claim 3, further comprising sending out the selected award to the purchaser.

5. The method of claim 1, wherein the plurality of award options comprise at least one of a cash-based rebate or refund, an entry into a sweepstakes, a gift card, a debit card, a credit card, a gift certificate, and a credit to an account.

6. The method of claim 5, further comprising sending out the selected award to the purchaser.

7. The method of claim 1, wherein the unique transaction data is provided on a printed receipt supplied at the time of purchase and delivery of the qualified item.

8. The method of claim 1, wherein the unique transaction data is provided on a printed invoice or packing slip supplied at the time of delivery of the qualified item.

9. The method of claim 1, wherein the unique transaction data is delivered by electronic means to the purchaser.

10. The method of claim 1, wherein applying automated, rules based control validation comprises checking for changes in services or for product returns and adjusting any corresponding award options available to the purchaser accordingly.

11. The method of claim 1, wherein applying automated, rules based control validation comprises checking for changes in services or for product returns and adjusting the selected award accordingly.

12. The method of claim 1, wherein the unique transaction data is associated with a point of sale transaction comprising at least one of a purchase or delivery of multiple qualified items.

13. The method of claim 1, wherein the unique transaction data is associated with multiple point of sale transactions each comprising at least one of a purchase or delivery of a qualified item, and wherein transmitting a data request for purchase data associated with the point of sale transaction comprises transmitting one or more data requests for purchase data associated with each point of sale transaction.

14. The method of claim 1, wherein the unique transaction data comprises a unique transaction code for the point of sale transaction.

15. The method of claim 1, further comprising providing the purchaser with a unique identifier that the purchaser can use to obtain subsequent status information relating to the award via the computer information network.

16. The method of claim 15, further comprising, upon receipt of the unique identifier, providing status information via the computer information network to the purchaser, the status information relating to substantially real-time status of processing of the award.

17. The method of claim 1, wherein the qualified item is a product.

18. The method of claim 1, wherein the qualified item is a service.

* * * * *

UNITED STATES PATENT AND TRADEMARK OFFICE
CERTIFICATE OF CORRECTION

PATENT NO. : 9,524,508 B2  
APPLICATION NO. : 14/754082  
DATED : December 20, 2016  
INVENTOR(S) : McIntyre et al.

Page 1 of 1

It is certified that error appears in the above-identified patent and that said Letters Patent is hereby corrected as shown below:

In the Specification

Column 2, Line 67, delete "on in" and insert --on-- therefor.

Column 3, Line 62, delete "team" and insert --learn-- therefor.

Column 6, Line 56, delete "y" and insert --by-- therefor.

Signed and Sealed this  
Fourteenth Day of February, 2017

Michelle K. Lee  
*Director of the United States Patent and Trademark Office*